Dec. 20, 1960  D. R. HAWKINSON ET AL  2,965,119
PUMPING SYSTEM DELIVERING FLUID AT A CONTROLLED RATE
Filed Aug. 25, 1958  2 Sheets-Sheet 1

INVENTORS:
DONALD R. HAWKINSON
SHERMAN Z. DUSHKES
BY: *Oswald H. Milmore*
THEIR ATTORNEY United States Patent Office 2,965,119
Patented Dec. 20, 1960

2,965,119

PUMPING SYSTEM DELIVERING FLUID AT A CONTROLLED RATE

Donald R. Hawkinson, Kensington, and Sherman Z. Dushkes, Redwood City, Calif., assignors to Shell Oil Company, a corporation of Delaware Filed Aug. 25, 1958, Ser. No. 756,851

13 Claims. (Cl. 137—115)

The invention relates to pumping apparatus designed to deliver fluid under pressure at a controlled rate, irrespective of variations in the resistance to flow in the discharge from the pumping system. It is further concerned with a proportioning system wherein the rates of liquid delivery can be varied and wherein liquids can be mixed in a desired ratio at a constant or a controlled variable rate.

The invention provides a pumping system which is applicable to the delivery of viscous liquids, such as convertible resins, against a flow resistance which is subject to variations due to changes in the viscosity of the liquid, to changes in the flow rate, to other uncontrollable changes in the resistance through devices through which the liquid is to flow, such as mixers. The invention is particularly useful for blending such a resin with a curing agent. It may, however, be applied in other fields, such as the manufacture of artificial fibers, wherein it is desired to deliver liquid under pressure to a jet head at a constant and controlled rate.

Pumping systems employing a pair of pumps in tandem are known. It is usual to operate the first of these pumps to deliver a greater quantity of liquid than the second one and to spill or recycle the excess liquid to the intake of the first pump, so as to maintain a desired pressure at the intake of the second pump, for example, equal to that of its discharge, which permits the latter pump to control or meter the flow rate. Such systems present certain difficulties when used under conditions where the flow resistance varies considerably and/or when the net flow rate is varied, especially when the delivery rate of the control pump is varied independently of that of the first pump. In such operations the control or metering pump operates at the elevated output pressure, and accurate metering or control pumps capable of working at such pressures are costly. Further, in such systems the delivery rate is not readily controlled, for a pressure change in the final discharge must be detected as a difference between two large pressures before the spill or return flow comes into operation; this places special demands on the pressure-detecting elements, reducing their sensitivity and requiring them, too, to be constructed for high-pressure operation.

Such systems further present difficulties when used in each of two or more branches for proportioning two fluid streams where it is desired to have a variable ratio and a variable total flow rate. It becomes desirable then to operate the several pumps from a common drive for operation at fixed speed ratios, so that all run faster or slower, as the case may be, when a change in total flow rate is required; at least one of the branches then is provided with means for varying the delivery rate of the control pump independently of the speed of the other pumps, so as to achieve a control of the ratio at which the liquids are blended. When the control pumps are, in such a system, located as the down-stream pumps they are subject to direct influence by pressure fluctuations caused by changes in the output of another branch. This results in disturbances which at times result in hunting or "noise."

It is an object of the invention to provide an improved pumping system employing a pair of pumps in series which delivers liquid under pressure at a controlled rate regardless of variations in the discharge pressure wherein the control pump and the pressure-detecting elements can operate at pressures substantially equal to the pressure at which the liquid is supplied to the first pump, e.g., atmospheric pressure.

A further object is to provide an improved system for proportioning a plurality of fluid streams, employing a corresponding plurality of pairs of pumps, of which one is a control pump and the other a driver or booster pump, wherein the tendency to interference between the controls in the several branches is minimized.

The main feature of the invention resides in arranging an upstream flow-control pump in series with a downstream power or booster pump, the latter having a by-pass conduit interconnecting its intake and discharge for recycling excess liquid, the by-pass conduit having a throttling valve provided with an actuator which is controlled at least in part by the pressure at the booster pump intake to balance the control pump. In the preferred embodiment, wherein the fluid is supplied to the control pump from a substantially constant-pressure souce, such as a reservoir which is maintained at atmospheric pressure, the throttling valve is operated solely in response to the pressure at the intake to the booster pump. However, when the fluid is supplied at a variable feed pressure the throttling valve is controlled by the differential pressure across the control pump.

When used for blending two or more fluids a pair of such pumps is provided for each of the liquids, the pumps being preferably driven from a common drive for operation in a predetermined ratio regardless of the drive speed. It is advantageous to employ a variable volume pump as the control pump in one or more of the branches, to permit variation in the delivery rate independently of the drive speed.

The invention will be further described with reference to the accompanying drawings forming a part of this specification and showing certain preferred embodiments by way of illustration, wherein.

Figure 1:
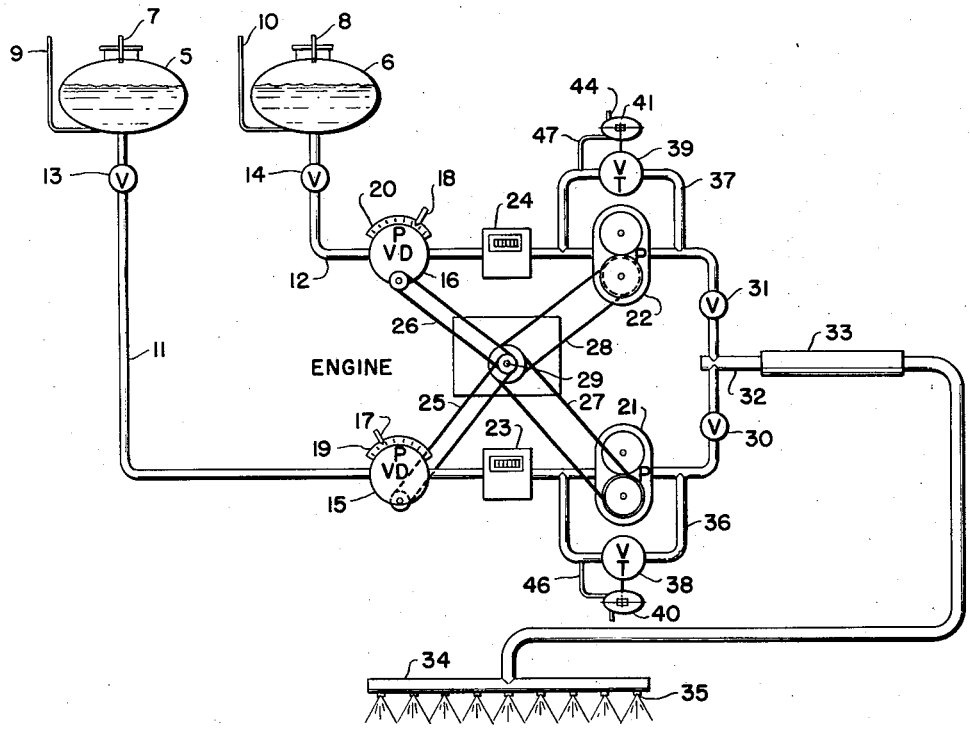
Figure 1 is a diagrammatic view of a proportioning system including two branches, each using the tandem arrangement of the invention, using constant-pressure fluid supplies.

Referring to Figure 1, there is shown a proportioning system suitable, for example, for mounting on an automotive vehicle for applying to road surfaces a mixture of a convertible resin mixed with a hardening agent, i.e., a curing agent or catalyst which, when mixed with the convertible resin, causes the latter to set into a hard mass. The system includes a pair of tanks 5, 6, for the liquid resin and curing agent, respectively, which are maintained at atmospheric pressure through vents in the covers 7, 8, and further by dip-stick pipes 9, 10, so that the liquids are supplied by gravity at substantially constant pressure through the supply pipes 11, 12 and shut-off valves 13, 14 to the intakes of metering or flow-control pumps 15, 16. These pumps are preferably of the positive displacement type, such as rotary pumps. As indicated, they are variable displacement pumps, i.e., pumps wherein the extent of expansion and contraction of the pump cavity can be adjusted, e.g., by a control lever 17 or 18 cooperating with a graduated scale 19 or 20. The delivery rates of the pumps can thereby be varied independently of the pump shaft speed. Such variable-displacement pumps are known and commercially available and are therefore not further described; an example is the variable displacement pump described in Bulletin No. 132 of the Granberg Corporation of Oakland, California.

The discharges of the control pumps are connected to the intakes of power or booster pumps 21, 22, optionally through flow meters 23, 24. The pumps 21, 22 may be of any desired type, centrifugal or positive displacement, and rotary pumps of the gear type are shown. The pumps are driven by any suitable means, such as sprocket chains 25—28 engaging sprocket wheels on a common drive shaft 29 which may be driven by the engine of the vehicle, so that the several pumps operate at rates proportional to the vehicle speed. The booster pumps 21 and 22 have higher delivery rates than the delivery rate at which the corresponding pumps 15 and 16 are operated, preferably higher than their maximum delivery rates and higher by an amount not less than the normal slip of the booster pumps for highest discharge pressure expected and based on performance using lowest viscosity material to be pumped. The discharges of the booster pumps are connected through shut off valves 30 and 31 to a manifold 32 leading to a mixing tube 33 which contains packing to provide a tortuous path and induces intimate mixing of the liquids. The resulting mixture flows to a spray bar 34 having spray tips 35 from which the mixture is sprayed onto the roadway. The mixing tube and spray tips impose resistance to the flow of liquid, so that the booster pumps discharge against a pressure, e.g., 100 to 200 lbs. per sq. in.

Figure 2:
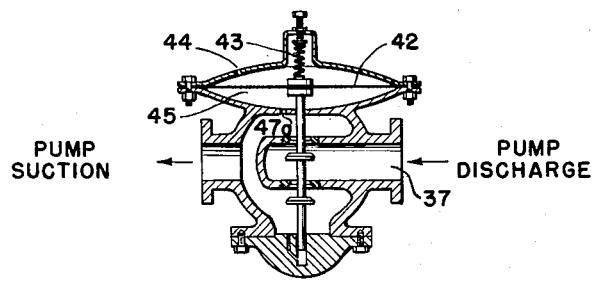
Figure 2 is a fragmentary view of the by-pass conduit, the throttling valve and the control therefor, showing a minor modification.

Each booster pump has a by-pass conduit 36 or 37 containing a throttling valve 38 or 39 which is equipped with an actuator or valve operator 40 or 41 for automatic operation in response to the pressure at the intake of the respective booster pump. In the illustrative embodiment shown in Figure 2, the actuator includes a movable wall in the form of a diaphragm 42 connected to the valve spindle and urged by the spring 43 to move the spindle toward open position. One side of the diaphragm is exposed to atmospheric pressure through a vent 44. The other side is exposed to fluid within a housing 45, which tends to close the valve. The fluid in the housing 45 may be the liquid handled by the pump, which is supplied through a small duct 46 or 47 in communication with the pump intake through the down-stream end of the by-pass conduit 36 or 37. In Figure 2 the duct 47 is replaced by a port 47a placing the housing 45 into communication with part of the by-pass conduit downstream from the throttling valve.

In operation, when the drive shaft 29 is rotated to operate the four pumps and the valves 13, 14, 30 and 31 are open, liquids are supplied from the tanks 5 and 6 at substantially atmospheric pressure and delivered by the flow-control pumps 15 and 16 through the meters 23 and 25 at rates determined by the positions of the levers 17 and 18 and the speed of rotation of the drive haft. Accurate metering of this flow is possible only if the control pumps are balanced, i.e., if the difference of intake and discharge pressures is always constant, preferably equal. Because the booster pumps have higher capacities than their respective control pumps, cavitation would occur at their intakes if the throttling valves 38 and 39 were closed. Conversely, complete opening of these valves would cause a rise in pressure at the booster pump intakes. By a proper partial opening of these valves a part of the discharge from each booster pump is recycled in the correct amount to maintain the pressure at the intake at atmospheric pressure or at a low constant pressure such that the intake and discharge pressures of the control pumps are equal.

The automatic control functions as follows: When the back-pressure in the discharge system, i.e., the mixing tube 33 and the spray tips 35, increases for any reason, such as an increase in the viscosity of the liquid or an increase in the flow rate, such as would be caused by an increase in the speed of the vehicle, the pressure in the ducts 46 and 47 rises, moving the valve spindles toward closed position to further throttle the recycle flow through the by-pass conduits 36 and 37, so as to maintain the pressure at the booster pump intakes constant. This maintains the control pump balanced. The same consequence ensues when the control lever 17 and/or 18 is shifted to feed liquid at an increased rate. Conversely, the throttle valves open farther to effect increased recycling when the opposite conditions occur. These disturbances have no effects on the pressure difference across the control pumps and steady operation, indicated by the meters 23, 24, is attained.

Figure 3:
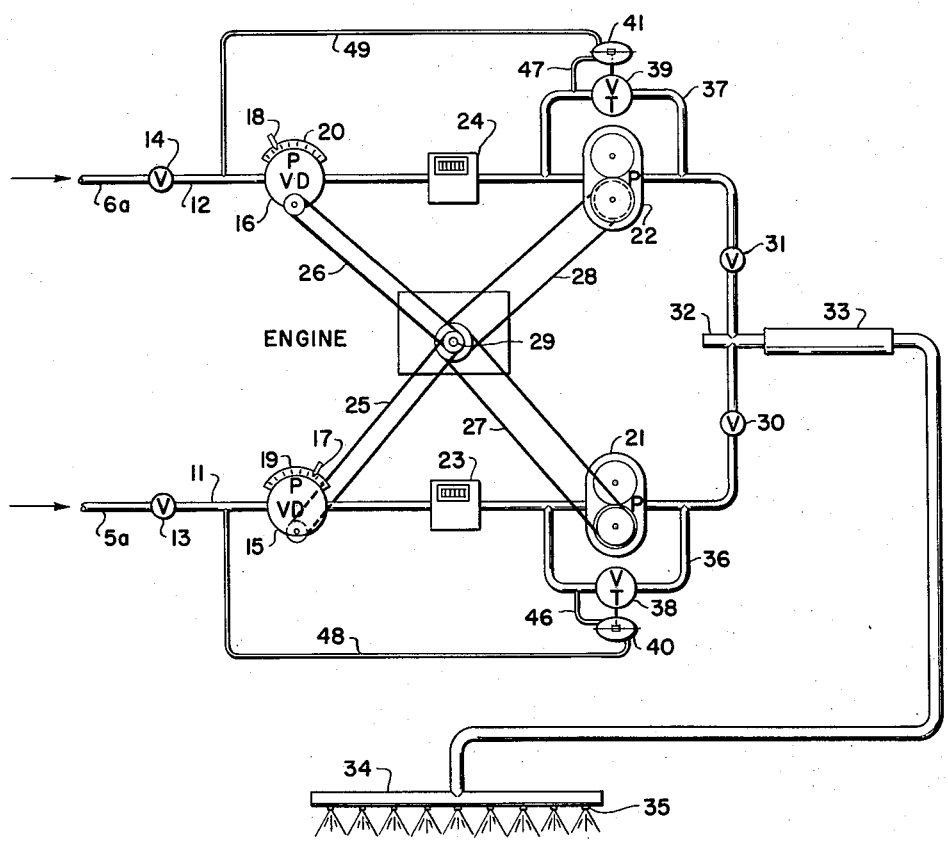
Figure 3 is a diagrammatic view of a modified arrangement, wherein the fluids may be supplied at variable pressures.

In the embodiment of Figure 3 like reference characters denote like parts. In this embodiment the liquids are supplied to the supply pipes 11 and 12 from sources, indicated by pipes 5a and 6a, at pressures which are not necessarily constant or atmospheric but may be subject to variations. In this case ducts 48 and 49 connect the intakes of the control pumps 15 and 16 respectively to those sides of the actuator diaphragms which were exposed to atmospheric pressure in Figure 1. Ducts 46 and 47 remain as previously described to connect the discharge pressures of the control pumps to the other sides of the diaphragms. Any differential pressure across either diaphragm acts to move the corresponding throttling valve toward open position when the supply pressure at the intake of the control pump rises in relation to its discharge pressure, and conversely toward closed position when supply pressure at the intake of the control pump drops in relation to its discharge pressure.

The behavior of the system when the discharge pressure of the control pump varies is as described for the system shown in Figure 1. In this manner the throttling valves are automatically adjusted to keep the control pumps balanced.

We claim as our invention:

1. Pumping system for delivering fluid under pressure at a controlled rate which is independent of the delivery pressure, which comprises in combination and in the order named: a flow-control pump; a booster pump having its intake connected to the discharge of the control pump and having a discharge for delivering fluid under pressure; means for driving said metering and booster pumps at rates so that the pumping rate of the booster pump exceeds that of the metering pump; a by-pass conduit interconnecting the intake and discharge of the booster pump; a throttling valve in said by-pass conduit; and means for operating said valve to balance the intake and discharge pressures of the control pump, said means including a valve actuator responsive to the pressure at the intake of the booster pump.

2. A pumping system according to claim 1 wherein said actuating means comprises a movable wall connected to a flow-control element of said throttling valve, resilient means urging said element of the throttling valve toward open position, and duct means for subjecting a surface of said movable wall to the pressure substantially equal to that of fluid at said intake of the booster pump so as to move said element toward closed position in opposition to the resilient means.

3. Pumping system according to claim 1 wherein said operator for the throttling valve is responsive only to the pressure at the intake to the booster pump.

4. Pumping system according to claim 1 wherein said operator for the throttling valve is responsive to the pressure differential between the intakes to the control pump and the booster pump.

5. In combination with the pumping system according to claim 1, means for varying the delivery rate of the flow-control pump independently of the total delivery rate of the booster pump.

6. A pumping system according to claim 1 wherein said flow-control pump is a variable-displacement, positive displacement pump.

7. A pumping system according to claim 6, wherein said driving means includes a drive mechanism mechanically connected to both said pumps for driving said pumps at a fixed speed ratio.

8. In combination, a pair of pumping systems as specified in claim 1, the discharges from the two booster pumps being connected into a common discharge conduit, for blending two fluids in controlled proportions.

9. A pumping system for delivering liquid under pressure at a controlled rate which is independent of the delivery pressure, which comprises in combination: a source of said liquid at substantially constant pressure; a variable-displacement flow-control pump having its intake connected to said source; a booster pump having the intake thereof connected to the discharge of said flow-control pump and having a discharge connected to a conduit which provides a flow-resistance, whereby the booster pump discharges under pressure; means for driving said flow-control and booster pumps at rates so that the pumping rate of the booster pump exceeds that of the flow-control pump; a by-pass conduit interconnecting the intake and discharge of the booster pump; a throttling valve in said by-pass conduit; and means responsive to the pressure in the intake to the booster pump for actuating said throttling valve toward closed position upon a rise in the said pressure in the booster pump intake and toward open position upon a drop in said pressure, so as to maintain said pressure substantially constant.

10. Pumping system for proportioning two streams of liquids and delivering said liquids under pressure at controlled rates which are independent of the delivery pressures, comprising in combination: sources for said liquid streams; a separate flow-control pump for each said liquid; a separate booster pump for each said flow-control pump having the intake thereof connected to the discharge of the respective flow-control pump and the discharges of said booster pumps being connected to a common conduit having a flow-resistance, whereby the booster pumps discharge under pressure; means for driving said flow-control pumps and booster pumps at rates so that the pumping rate of each booster pump exceeds that of the flow-control pump connected thereto; means for varying the delivery rate of at least one of said flow control pumps independently of the delivery rate of the corresponding booster pump; a by-pass conduit for each said booster pump interconnecting the intake and discharge thereof; a throttling valve in each said by-pass conduits; and separate means for each said throttling valve responsive to the pressure in the intake of the respective booster pump for actuating the throttling valve toward close position upon a rise in the said pressure, so as to maitnain said pressure substantially constant.

11. A pumping system according to claim 10 wherein said sources for the liquid streams are reservoirs adapted to supply the liquids to the respective flow-control pumps at substantially constant pressure.

12. A pumping system according to claim 10, wherein said driving means includes drive means mechanically connected to all four of said pumps for driving said pumps at fixed speed ratio, said flow-control pumps are variable and positive-displacement pumps and said means for varying the delivery rate thereof includes mechanism for varying the extent of expansion and contraction of the flow-control pumps.

13. In combination with the pumping system according to claim 10, means for varying the total flow through both booster pumps by varying the speed of all four pumps while maintaining their speed ratios constant.

References Cited in the file of this patent

UNITED STATES PATENTS

| | | |
|---|---|---|
| 953,539 | Mendizabal | Mar. 29, 1910 |
| 2,557,334 | Zwack | June 19, 1951 |
| 2,564,306 | Isreeli et al. | Aug. 14, 1951 |
| 2,699,726 | Quinn | Jan. 18, 1955 |
| 2,702,591 | Dickey | Feb. 22, 1955 |